(12) United States Patent
Chao et al.

(10) Patent No.: US 7,562,933 B1
(45) Date of Patent: Jul. 21, 2009

(54) BICYCLE SEAT AND ASSOCIATED CLAMP

(76) Inventors: Kuo Chih Chao, No. 51, Hengjun Street, Dagia Town, Taichung Hsien (TW) 43743; Chia Pin Chen, No. 51, Hengjun Street, Dagia Town, Taichung Hsien (TW) 43743

( * ) Notice: Subject to any disclaimer, the term of this patent is extended or adjusted under 35 U.S.C. 154(b) by 0 days.

(21) Appl. No.: 11/546,734

(22) Filed: Oct. 11, 2006

(51) Int. Cl.
  *B62J 1/00* (2006.01)
(52) U.S. Cl. .............. 297/215.13; 297/215.14; 297/215.15; 297/195.1
(58) Field of Classification Search .......... 297/195.1, 297/195.11, 215.13, 215.14, 215.15
See application file for complete search history.

(56) References Cited

U.S. PATENT DOCUMENTS

| 2,931,423 A | * | 4/1960 | Kalter | 297/215.15 |
| 3,066,978 A | * | 12/1962 | Kalter | 297/215.15 |
| 4,568,121 A | * | 2/1986 | Kashima | 297/215.15 |
| 5,362,127 A | | 11/1994 | Chang | 297/195.1 |
| 5,383,706 A | | 1/1995 | Chen | 297/215.15 |
| 5,649,738 A | | 7/1997 | Thomson et al. | 297/215.15 |
| 6,899,389 B2 | * | 5/2005 | Saccucci | 297/215.15 |

* cited by examiner

*Primary Examiner*—Anthony D. Barfield (57) ABSTRACT

A bicycle seat device includes a seat post having a passage formed through a seat supporting base, a lower clamp member disposed on the seat supporting base and having an oblong hole aligned with the passage of the seat supporting base, a saddle having a space formed by a casing, an upper clamp member engaged into the space of the saddle and having a pathway and one or more recesses for receiving a pole. A fastener may clamp the saddle between the clamp members. The lower clamp member includes a curved surface for rotating relative to the seat supporting base to selected angular positions.

8 Claims, 15 Drawing Sheets

BICYCLE SEAT AND ASSOCIATED CLAMP

BACKGROUND OF THE INVENTION

1. Field of the Invention

The present invention relates to a bicycle seat, and more particularly to a bicycle seat assembly including a simplified clamp device for securing the bicycle seat assembly to the seat post.

2. Description of the Prior Art

Typical bicycle seats comprise a seat body or a saddle to be attached or secured on top of a seat post with a clamp device, and various kinds of clamp devices have been developed for adjustably clamping or securing the seat body or saddle to the seat post and for allowing the seat body or saddle to be adjusted relative to the seat post to any selected or suitable angular position.

For example, U.S. Pat. No. 5,383,706 to Chen discloses one of the typical adjusting assemblies for a bicycle seat, and also comprises a seat body or saddle having two seat supporting rods to be attached or secured on top of a seat post with a clamp device, and the clamp device includes a pivotal base pivotally supported on top of the seat post and an upper cover or clamping member engaged onto the pivotal base for clamping the seat supporting rods between the clamping member and the pivotal base.

However, the clamp device includes a complicated structure having two or more bolts or fasteners for securing and clamping the seat supporting rods between the clamping member and the pivotal base, or the seat body or saddle may not be suitably secured to the seat post with a single fastener.

U.S. Pat. No. 5,362,127 to Chang discloses another typical bicycle saddle comprising an upper mounting block required to be engaged into an inner portion of a seat body for securing to a lower mounting block with two or more fasteners. However, the upper mounting block is engaged and received in the inner portion of the seat body and may not be easily engaged with the fasteners.

U.S. Pat. No. 5,649,738 to Thomson et al. discloses a further typical bicycle post and associated clamp also comprising an upper clamp member engaged onto a lower clamp member for securing and clamping the seat rails between the lower and the upper clamp members. Similarly, with such arrangement, the seat body or saddle also may not be suitably secured to the seat post with a single fastener.

The present invention has arisen to mitigate and/or obviate the afore-described disadvantages of the conventional clamp devices for securing the bicycle seats to the seat posts.

SUMMARY OF THE INVENTION

The primary objective of the present invention is to provide a bicycle seat assembly including a simplified clamp device for securing the bicycle seat assembly to the seat post.

In accordance with one aspect of the invention, there is provided a bicycle seat assembly comprising a seat post including a seat supporting base provided on top, the seat supporting base including a passage formed therein and offset from the seat post, a lower clamp member disposed on the seat supporting base and including an oblong hole formed therein and aligned with the passage of the seat supporting base, a saddle including a space formed therein and defined by a casing which is extended downwardly from the saddle for engaging with the lower clamp member, an upper clamp member engaged into the space of the saddle for allowing the saddle to be clamped between the lower clamp member and the upper clamp member, the upper clamp member including a pathway formed therein, and including at least one recess formed therein, a pole seated and anchored in the recess of the upper clamp member, and a fastener engaged through the passage of the seat supporting base and the oblong hole of the lower clamp member and the casing of the saddle and the pathway of the upper clamp member and engaged with the pole for securing and clamping the casing of the saddle between the lower clamp member and the upper clamp member.

The seat supporting base includes a curved surface formed in an upper portion thereof, and the lower clamp member includes a curved surface formed in a lower portion thereof for engaging with the curved surface of the seat supporting base and for allowing the lower clamp member to be pivoted relative to the seat supporting base to selected angular positions.

The lower clamp member includes a pair of side fences extended upwardly therefrom for engaging with the casing of the saddle and for anchoring the casing of the saddle between the side fences of the saddle.

The saddle includes an open top for allowing the upper clamp member and the pole to be easily engaged into the space of the saddle and to be easily engaged with the fastener. The pole includes a screw hole formed therein for engaging with the fastener.

The recess of the upper clamp member is either a lateral recess or a longitudinal recess formed in an upper portion of the upper clamp member. The seat supporting base includes a pair of side fences extended upwardly therefrom for defining the curved surface between the side fences and for engaging with the lower clamp member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-5, a bicycle seat assembly in accordance with the present invention comprises a seat post 10 including a seat supporting base 11 provided on top or extended from the upper portion of the seat post 10 for supporting a seat body or saddle 40 thereon. The seat supporting base 11 includes a concave or curved surface 12 formed in the top or the upper portion thereof, and a passage 13 formed in or through the seat supporting base 11 and offset from the seat post 10 for receiving a bolt or fastener 14. The seat supporting base 11 may further include a pair of side fences 15 extended upwardly therefrom (FIGS. 6-11) for forming or defining the concave or curved surface 12 between the side fences 15.

As shown in FIGS. 7 and 12-14, the seat supporting base 11 may further include an opening 16 formed therein and communicating with the passage 13 thereof for receiving the fastener 14, and may further include one or more compartments 17 formed therein (FIGS. 5, 7, 10-13, and 15) for such as weight reducing purposes. As shown in FIGS. 8-11, the seat supporting base 11 may further include an orifice 18 laterally formed therein and intersecting or communicating with the passage 13 thereof for receiving a rod 80 therein which may include a screw hole 81 formed therein for engaging with a bolt or fastener 82.

A lower clamp member 30 includes a concave or curved surface 31 formed in the bottom or lower portion thereof for engaging with the corresponding concave or curved surface 12 of the seat supporting base 11 for allowing the lower clamp member 30 to be pivoted or rotated relative to the seat supporting base 11 to any suitable or selected angular position (FIGS. 17-20). The lower clamp member 30 further includes an oblong hole 32 formed therein or therethrough and aligned with the passage 13 of the seat supporting base 11 for receiving the fastener 14 (FIGS. 1, 2, 4-7, 12-14) or the fastener 82 (FIGS. 8-11), and includes an upper surface or upper portion 33 for contacting or for engaging with the seat body or saddle 40, and may further include a pair of side fences 34 extended upwardly therefrom (FIGS. 1-3 and 12).

The saddle 40 includes a space 41 formed therein and defined by a casing 42 which may be extended downwardly from the saddle 40 for contacting or for engaging with the upper portion 33 of the lower clamp member 30 (FIGS. 2, 4-5) and/or confined or positioned or anchored between the side fences 34 of the saddle 40. An upper clamp member 50 is engaged into or received in the space 41 of the casing 42 or of the saddle 40 for allowing the casing 42 or the saddle 40 to be secured or clamped between the lower clamp member 30 and the upper clamp member 50 (FIGS. 2, 4-5), and the upper clamp member 50 includes one or more pathways 51 formed therein for receiving the fastener 14 (FIGS. 1, 2, 6-7, 12) or the fastener 82 (FIG. 8-11).

The upper clamp member 50 further includes one or more lateral recesses 52 and/or one or more longitudinal recesses 53 formed in the upper portion thereof each for receiving or seating or positioning or anchoring a pole 55 therein. The pole 55 includes a screw hole 56 formed therein for engaging with the bolt or fastener 14 (FIGS. 1, 2, 6-7, 12-14) which is engaged through the casing 42 or the saddle 40 for allowing the casing 42 or the saddle 40 to be solidly secured or clamped between the lower clamp member 30 and the upper clamp member 50 with the bolt or fastener 14. Alternatively, as shown in FIGS. 8-11, the fastener 82 may be engaged through either of the pathways 51 of the upper clamp member 50 and engaged with the screw hole 81 of the rod 80 for solidly securing or clamping the casing 42 or the saddle 40 between the lower clamp member 30 and the upper clamp member 50.

Figure 1:
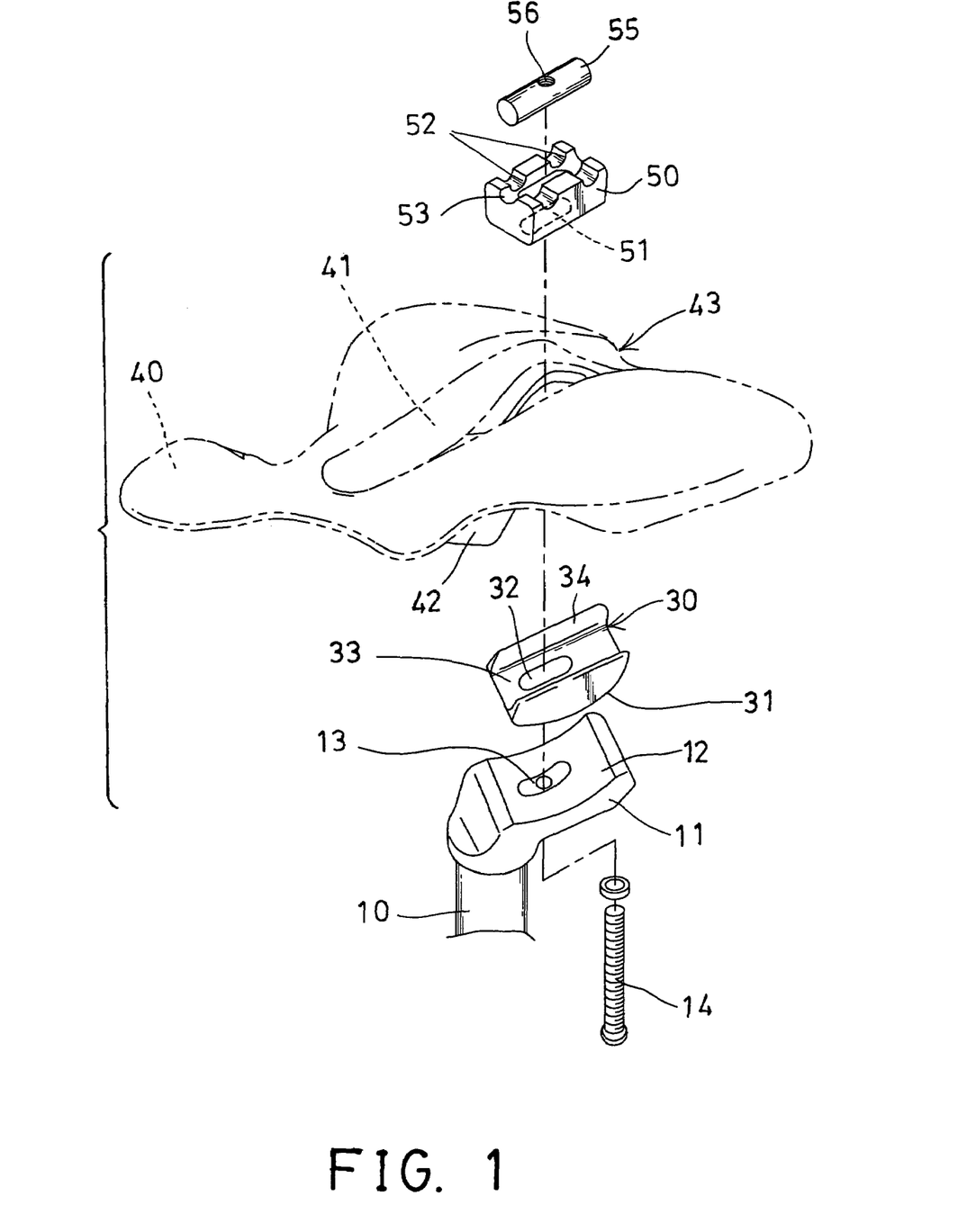
FIG. 1 is a partial exploded view of a bicycle seat assembly in accordance with the present invention.
Figure 2:
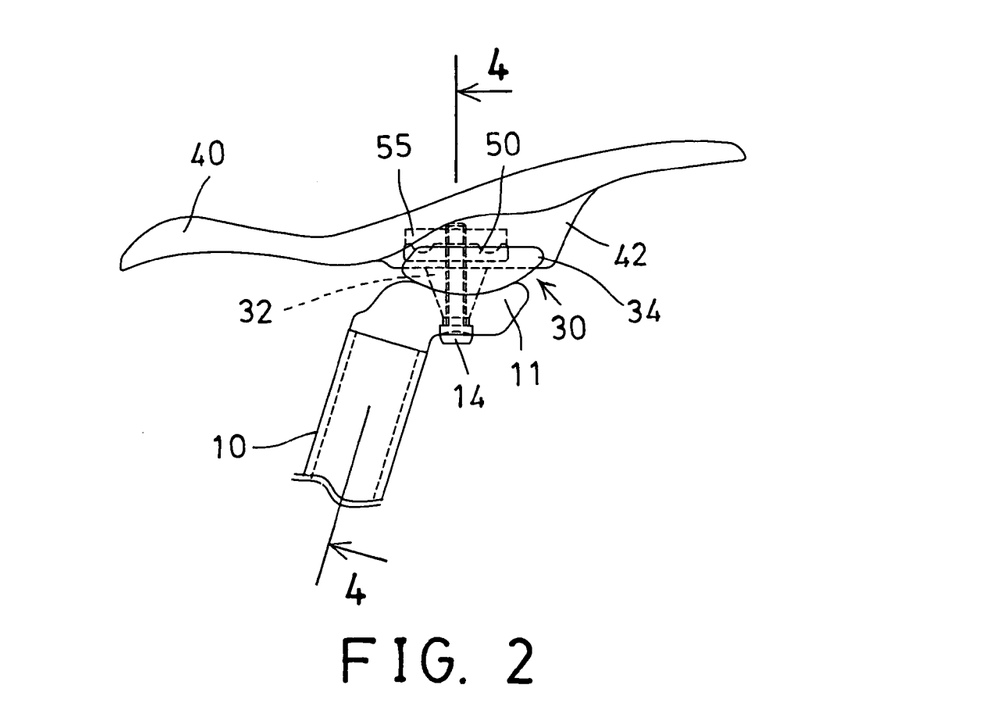
FIG. 2 is a partial side plan schematic view of the bicycle seat assembly.
Figure 3:
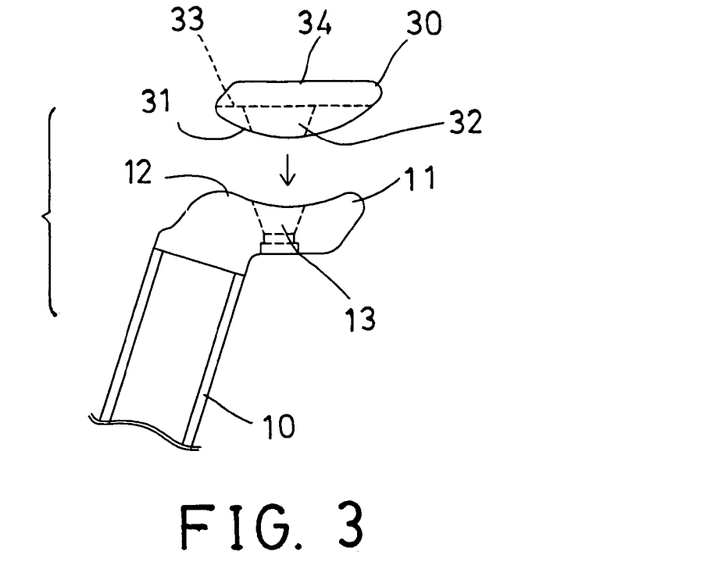
FIG. 3 is a partial side and exploded view of the bicycle seat assembly.
Figure 4:
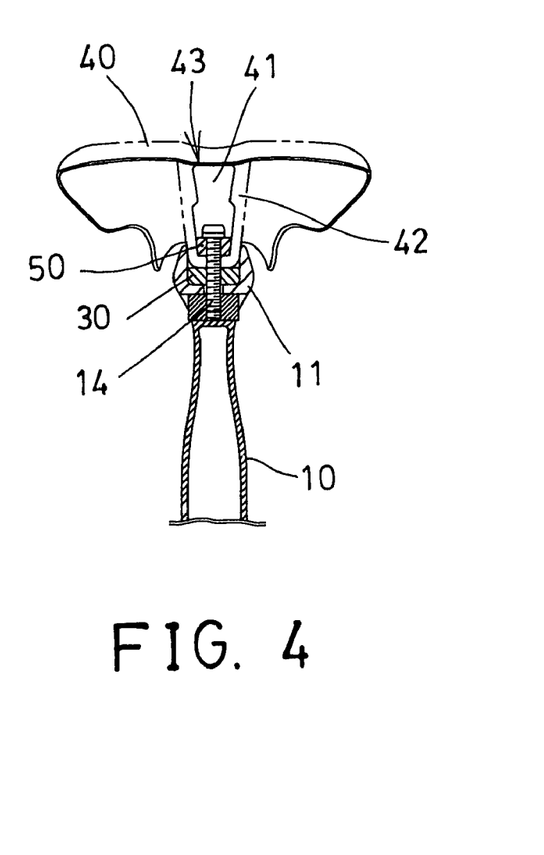
FIG. 4 is a partial cross sectional view of the bicycle seat assembly taken along lines 4-4 of FIG. 2.
Figure 5:
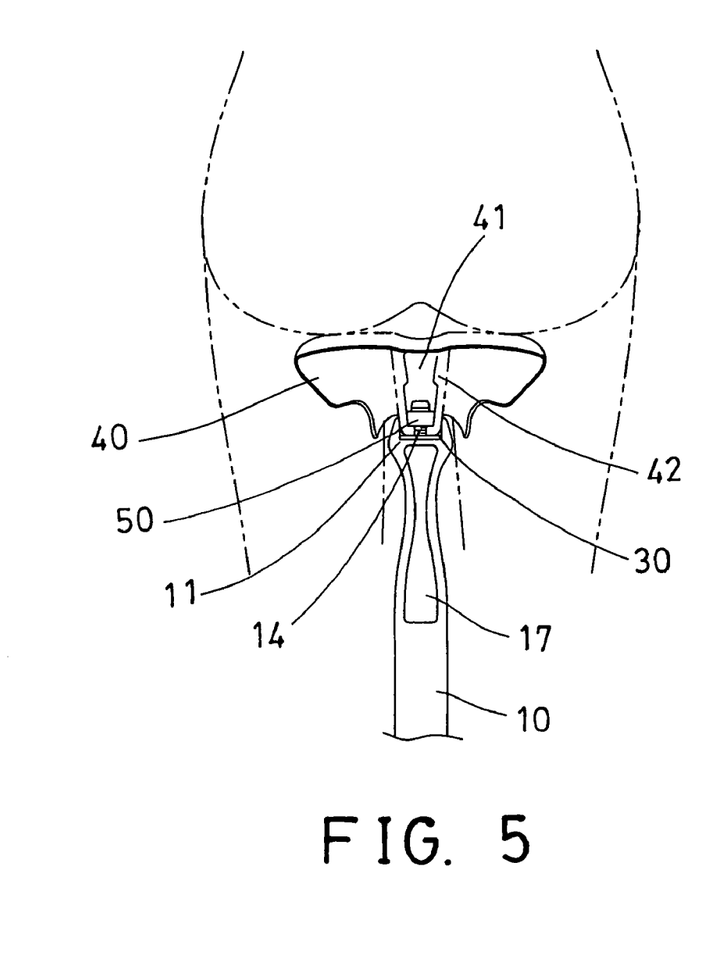
FIG. 5 is a partial rear plan schematic view illustrating the operation of the bicycle seat assembly.
Figure 6:
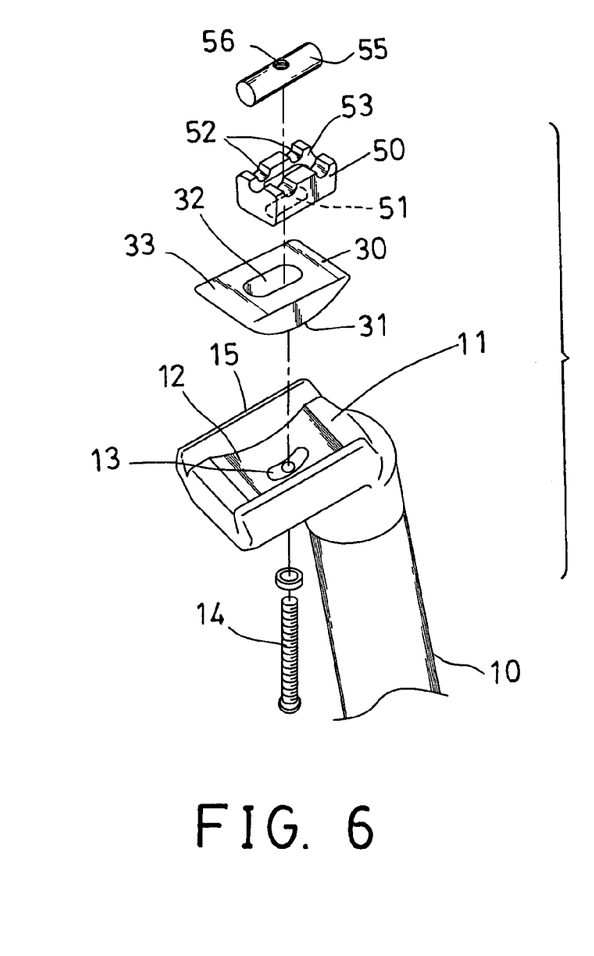
FIG. 6 is another partial exploded view illustrating the other arrangement of the bicycle seat assembly.
Figure 7:
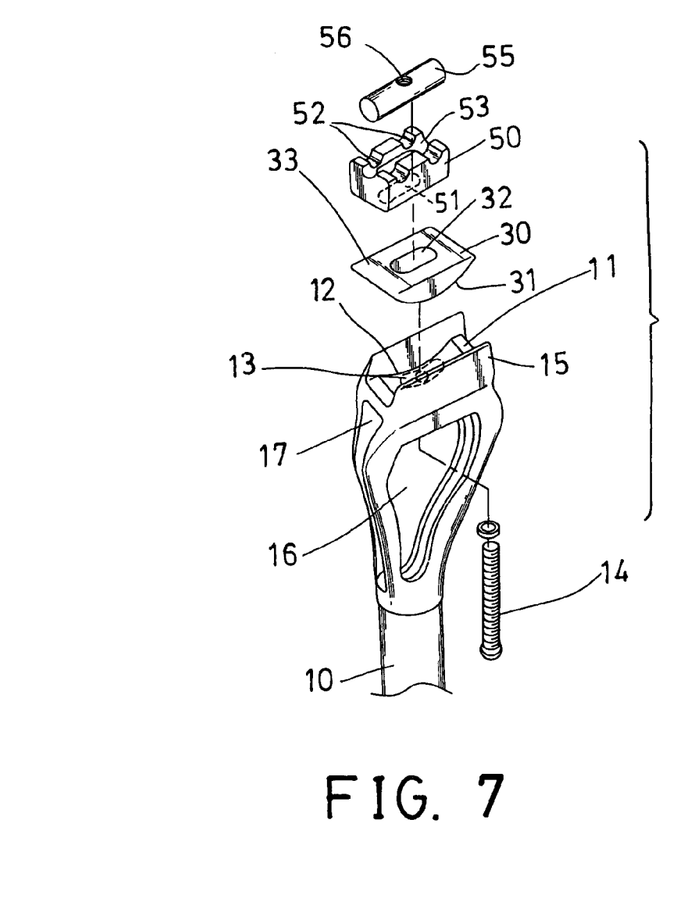
FIG. 7 is a further partial exploded view illustrating the further arrangement of the bicycle seat assembly.
Figure 8:
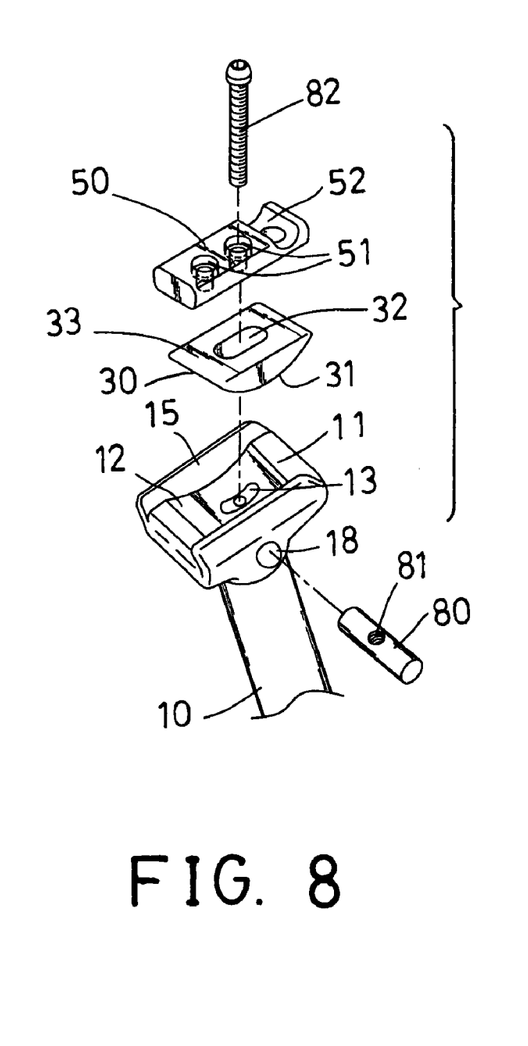
FIG. 8 is a still further partial exploded view illustrating the still further arrangement of the bicycle seat assembly.
Figure 9:
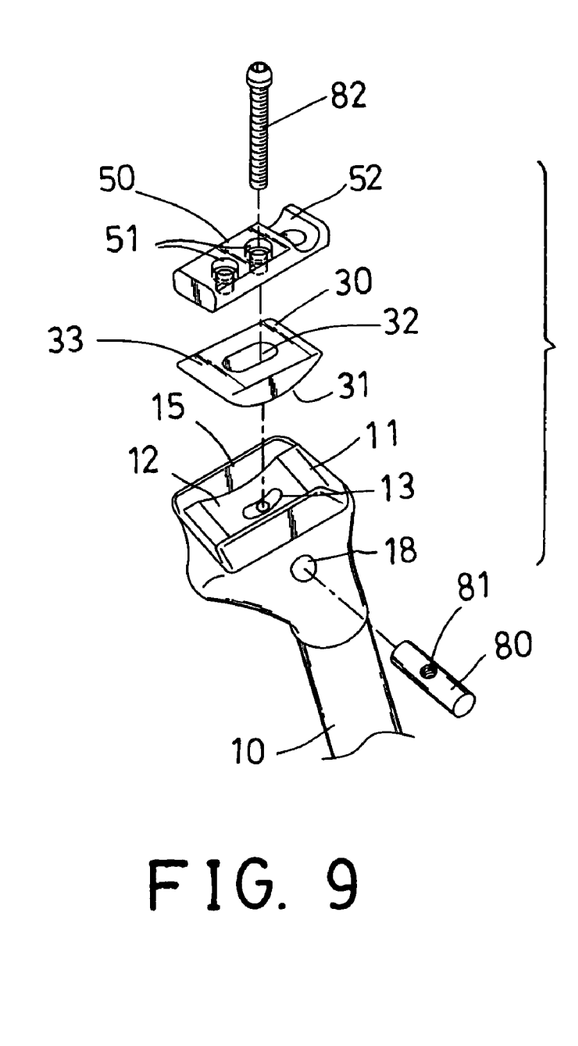
FIG. 9 is a still further partial exploded view illustrating the still further arrangement of the bicycle seat assembly.
Figure 10:
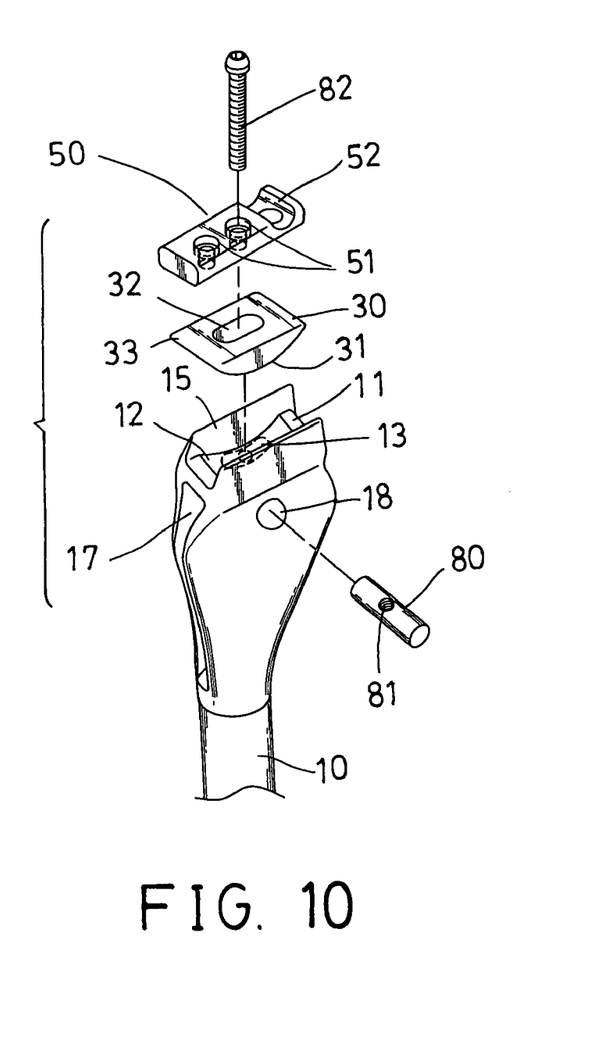
FIG. 10 is a still further partial exploded view illustrating the still further arrangement of the bicycle seat assembly.
Figure 11:
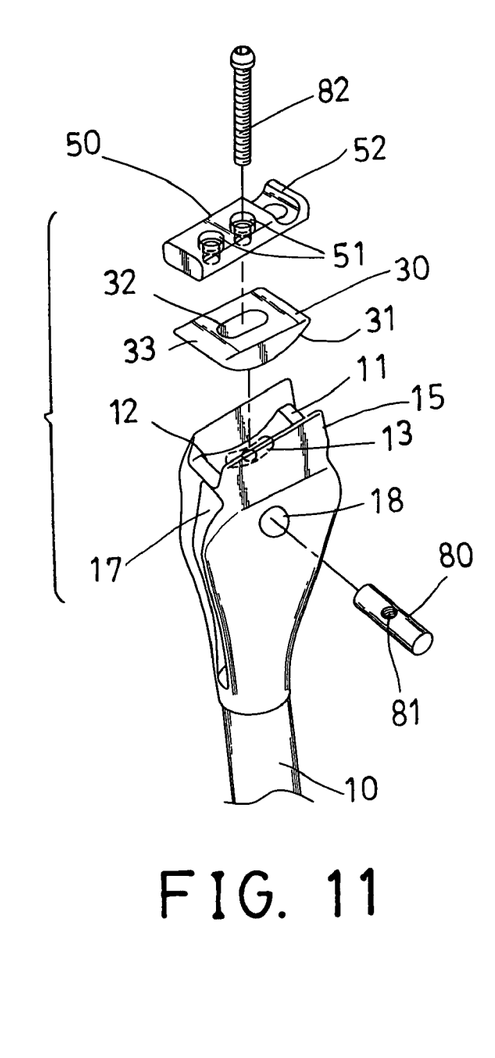
FIG. 11 is a still further partial exploded view illustrating the still further arrangement of the bicycle seat assembly.
Figure 12:
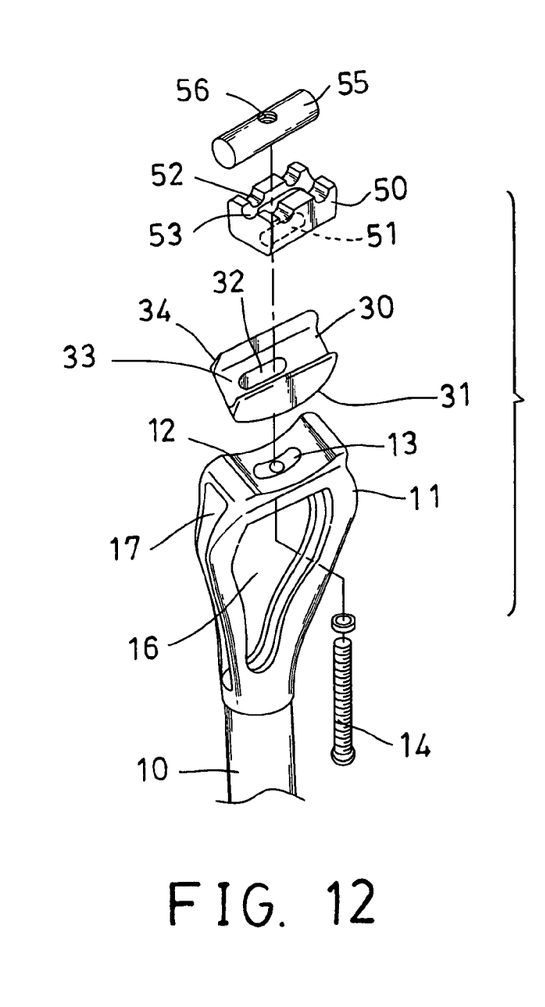
FIG. 12 is a still further partial exploded view illustrating the still further arrangement of the bicycle seat assembly.

It is to be noted that the typical bicycle seats failed to form or to provide a space 41 in the saddle 40 for receiving the upper clamp member 50 and for allowing the casing 42 or the saddle 40 to be solidly secured or clamped between the lower clamp member 30 and the upper clamp member 50 with the bolt or fastener 14 or 82. As best shown in FIG. 1, the space 41 of the saddle 40 includes an open top 43 for allowing the upper clamp member 50 and the pole 55 to be easily engaged into the space 41 of the saddle 40 and to be easily engaged with the bolt or fastener 14 or 82. The formation or the provision of the space 41 and/or the casing 42 in the saddle 40 allows the lateral or sidewise dimension of the saddle 40 to be suitably reduced or decreased.

Figure 13:
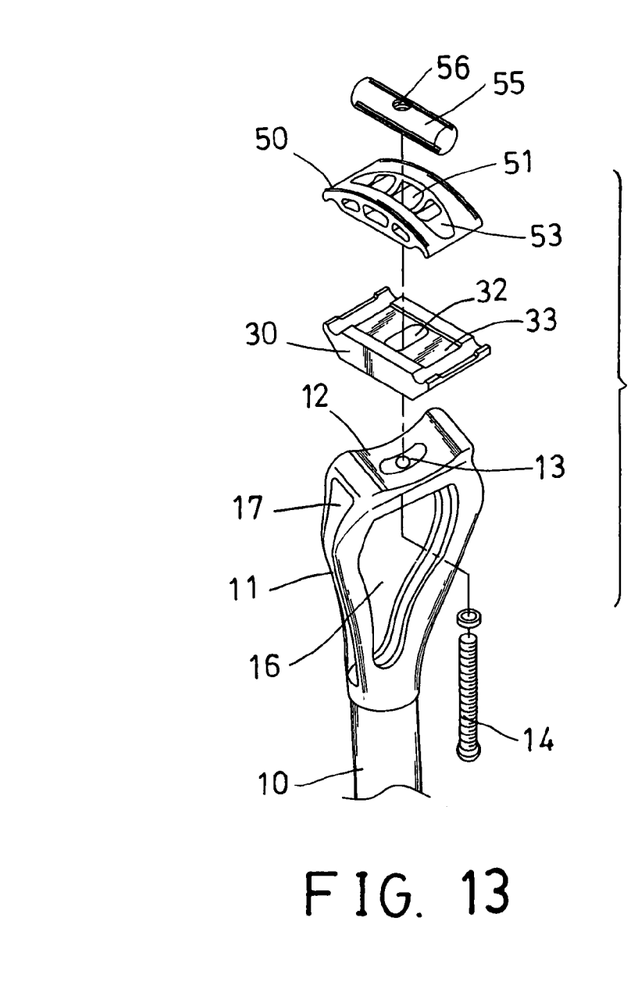
FIG. 13 is a still further partial exploded view illustrating the still further arrangement of the bicycle seat assembly.
Figure 14:
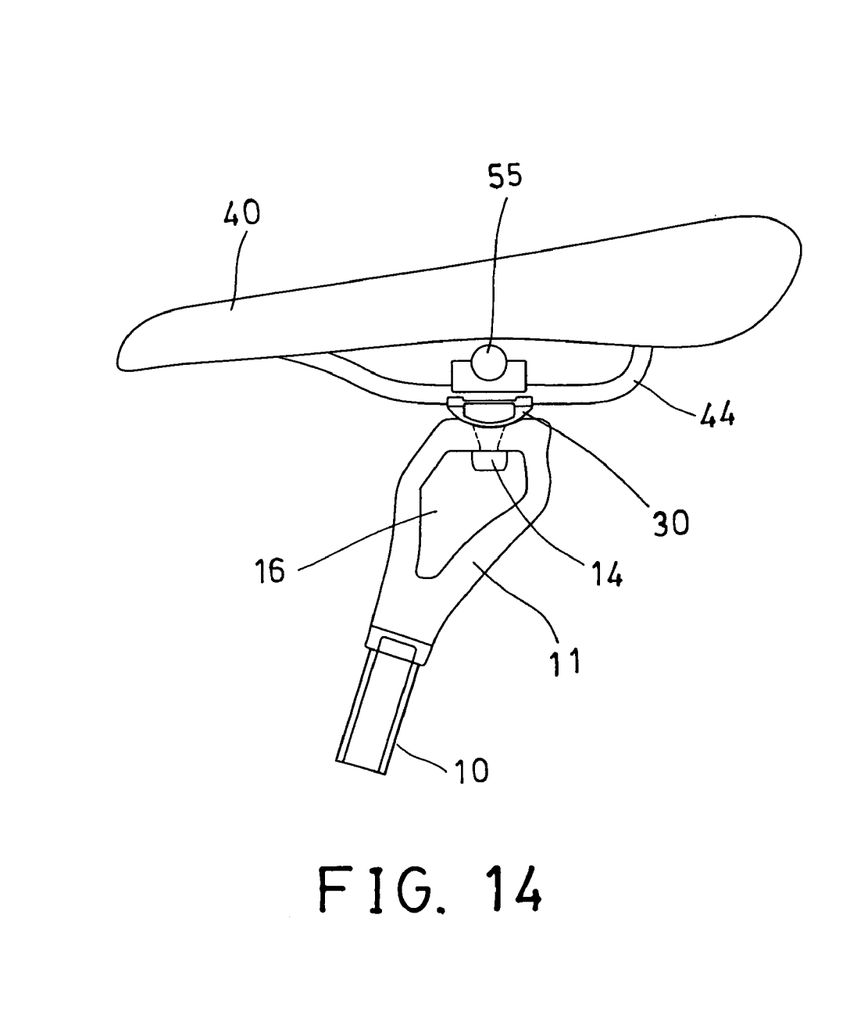
FIG. 14 is a partial side plan schematic view of the bicycle seat assembly as shown in FIG. 13.
Figure 15:
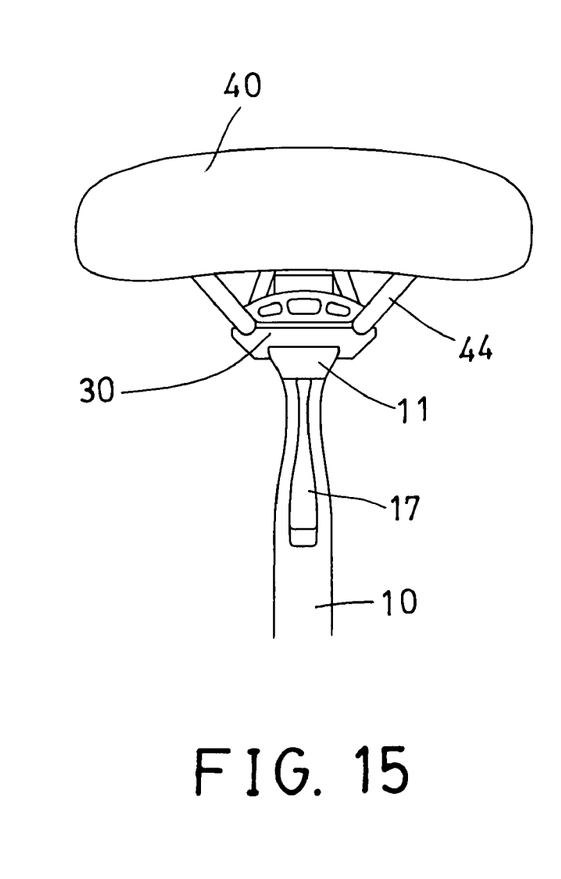
FIG. 15 is a partial rear plan schematic view of the bicycle seat assembly as shown in FIGS. 13-14.
Figure 16:
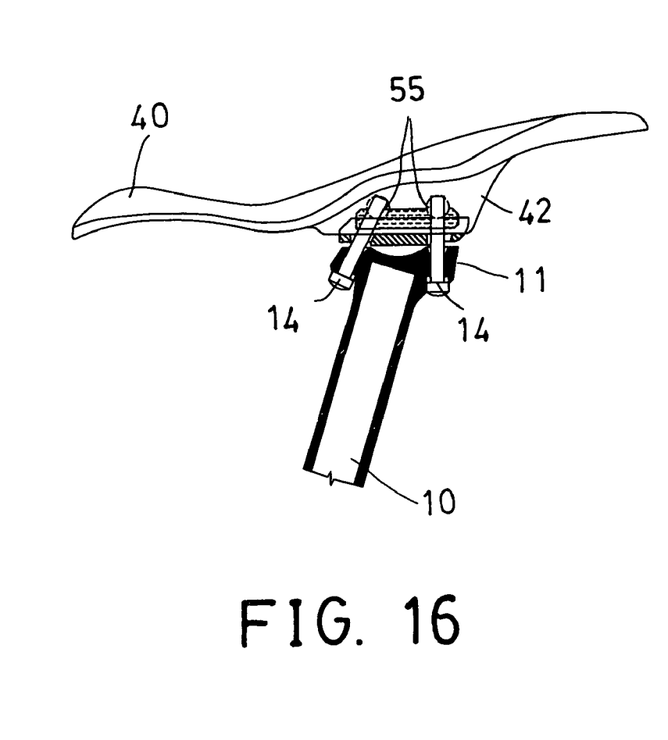
FIG. 16 is a further partial side plan schematic view illustrating the still further arrangement of the bicycle seat assembly.
Figure 17:
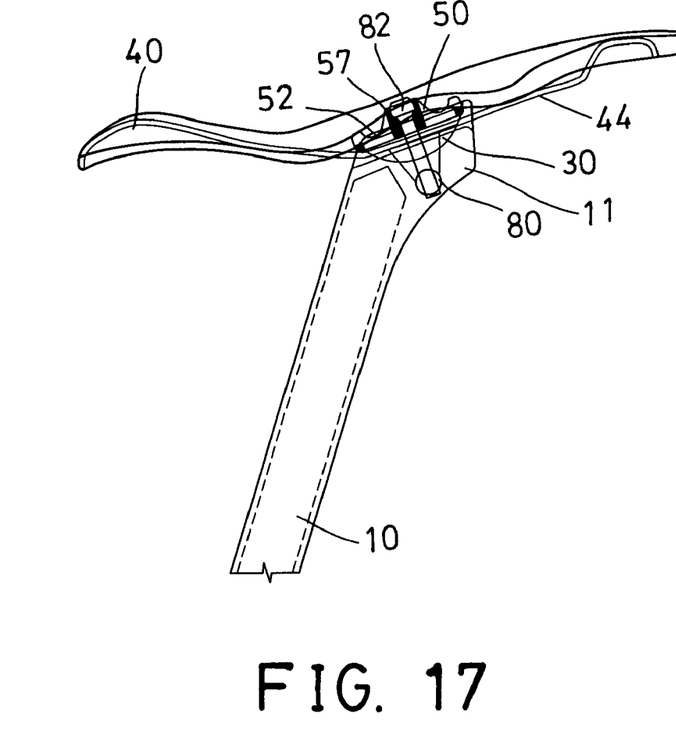
FIGS. 17, 18, 19 are further partial side plan schematic views illustrating the still further arrangement of the bicycle seat assembly.
Figure 18:
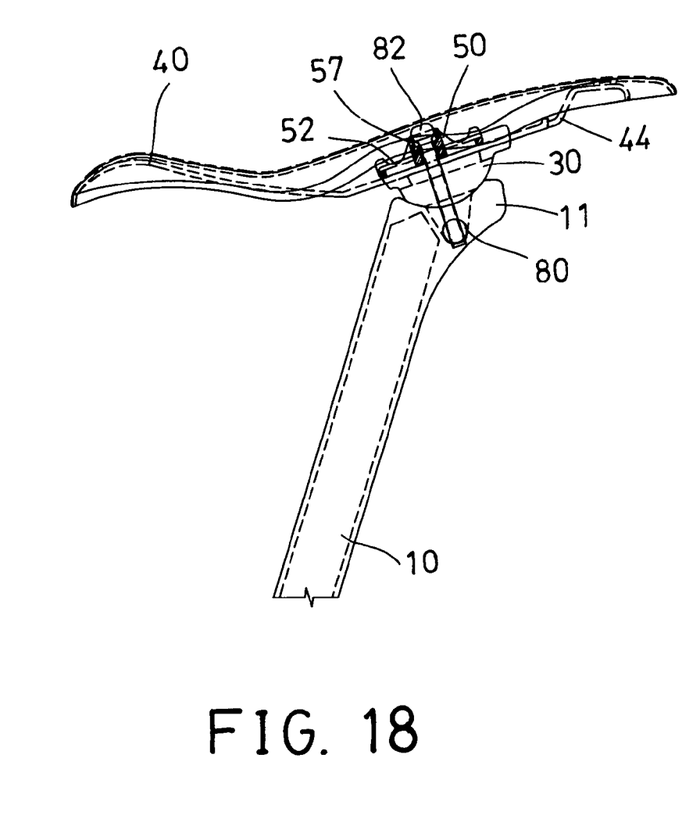
Figure 19:
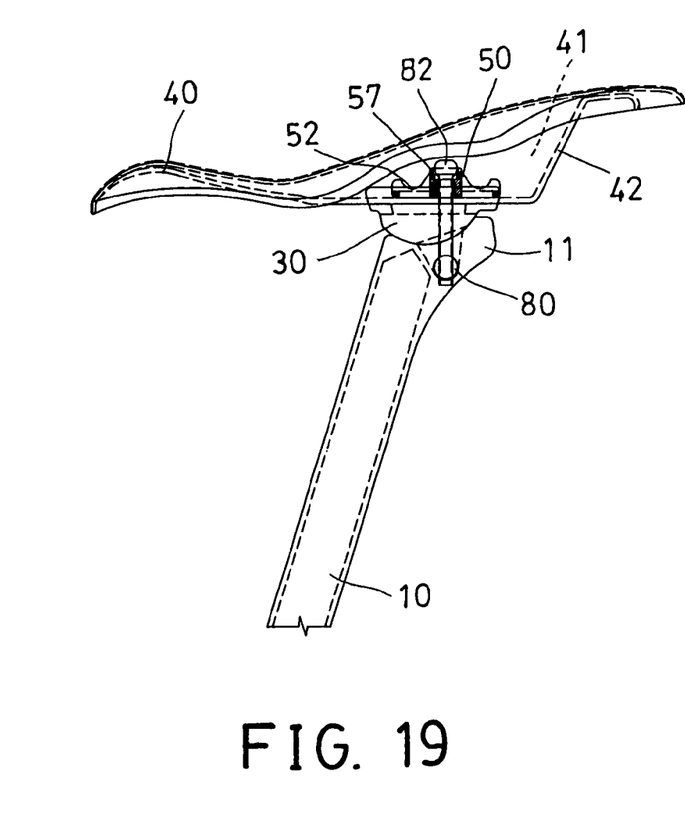
Figure 20:
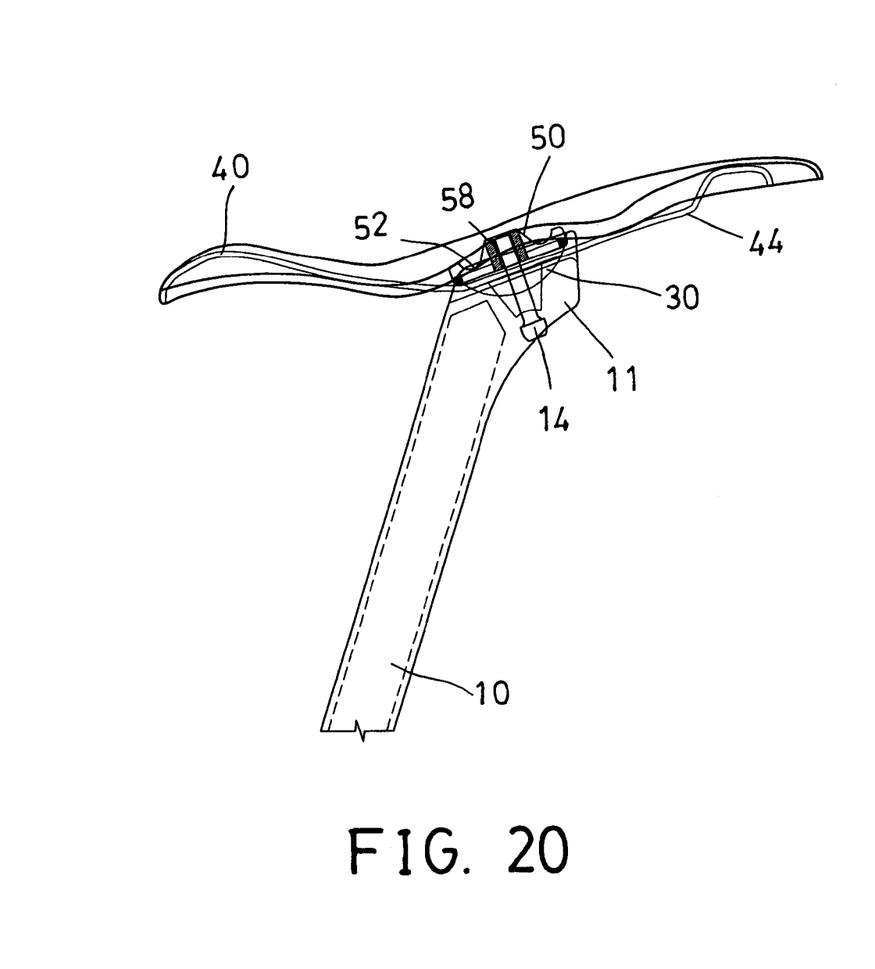
FIG. 20 is a further partial side plan schematic view illustrating the still further arrangement of the bicycle seat assembly.
Figure 21:
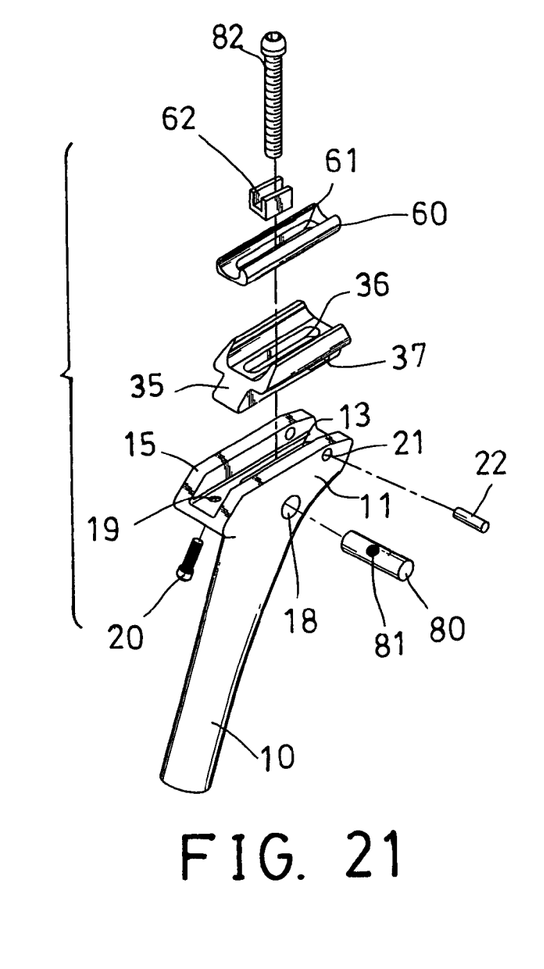
FIG. 21 is a still further partial exploded view illustrating the still further arrangement of the bicycle seat assembly.

As shown in FIGS. 13-15, the seat frames or seat rails 44 of the typical saddles 40 may also be secured to the seat supporting base 11 with the lower clamp member 30 and the upper clamp member 50 and the pole 55 and the bolt or fastener 14. As shown in FIG. 16, the casing 42 or the saddle 40 may also be solidly secured or clamped between the lower clamp member 30 and the upper clamp member 50 with two or more fasteners 14. As shown in FIGS. 17-19, the upper clamp member 50 may include a screw hole 57 formed therein for engaging with the bolt or fastener 82, or may include a screw hole 58 formed therein for engaging with the bolt or fastener 14 (FIG. 20).

Referring next to FIGS. 21-25, the seat supporting base 11 may further include an aperture 19 formed therethrough for receiving another fastener 20, and may further include a lateral orifice 21 formed through the side fences 15 of the seat supporting base 11 for receiving a shaft 22 therein. The lower clamp member 35 is slidably engaged onto the upper portion of the seat supporting base 11 and slidably engaged between the side fences 15 of the seat supporting base 11 and also includes an oblong hole 36 formed therethrough for receiving the fastener 82, and further includes a channel 37 formed in the side portion thereof for receiving the shaft 22 and for guiding and limiting the lower clamp member 35 to slide relative to the seat supporting base 11, and also for preventing the lower clamp member 35 from being disengaged from the seat supporting base 11.

Figure 22:
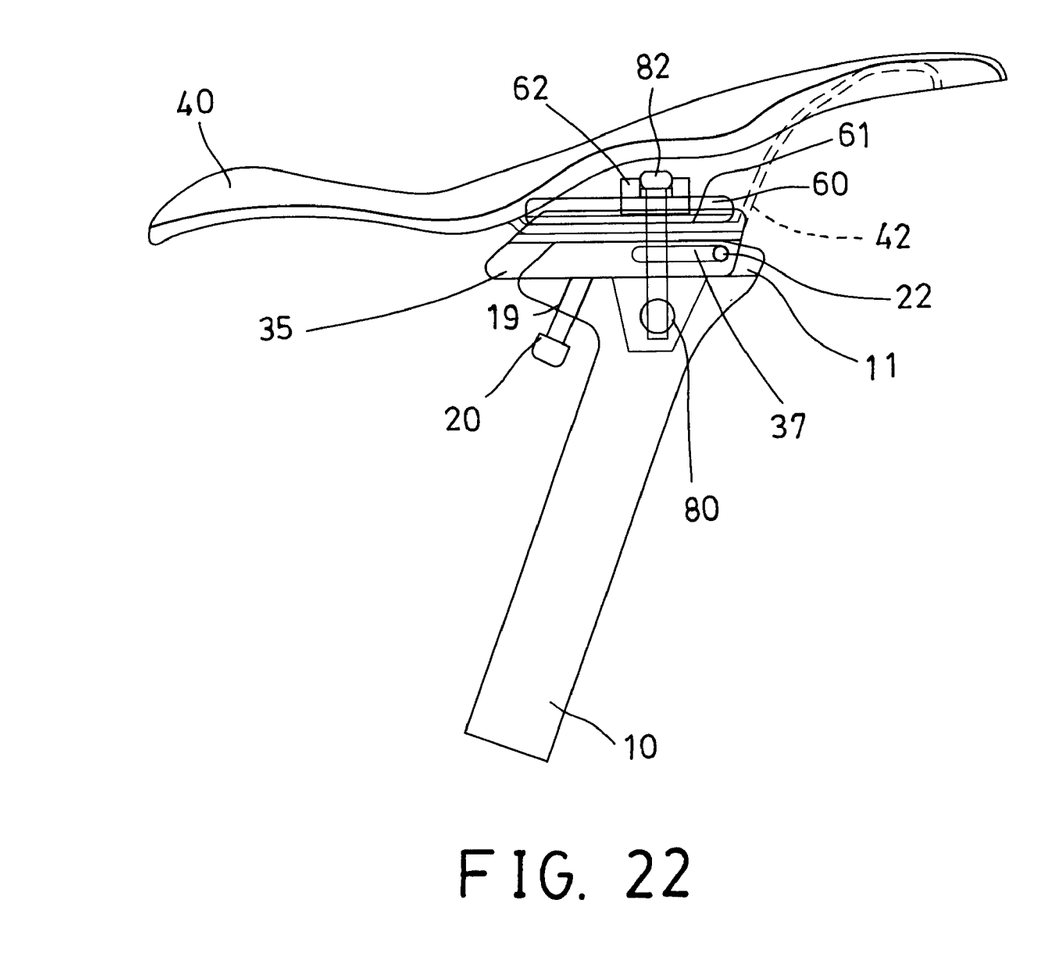
FIG. 22 is a partial rear plan schematic view of the bicycle seat assembly as shown in FIG. 21.
Figure 23:
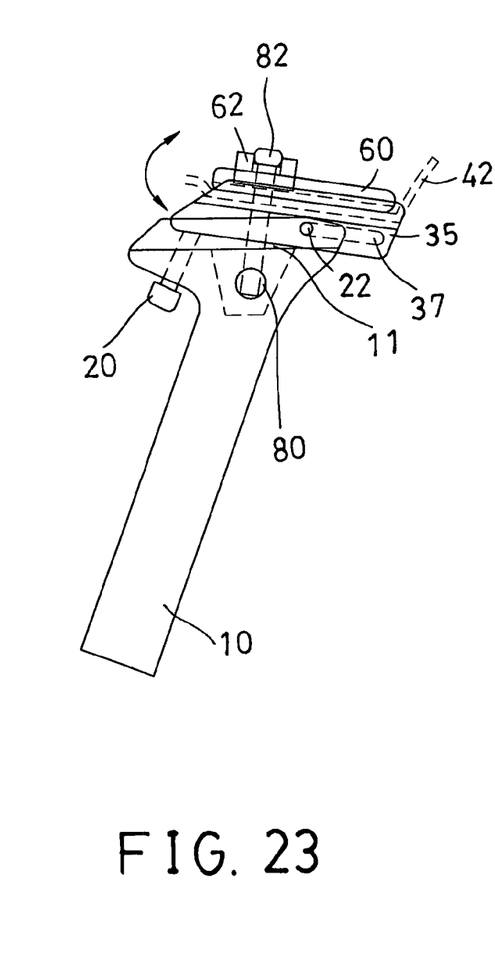
FIGS. 23, 24, 25 are partial rear plan schematic views illustrating the operation of the bicycle seat assembly as shown in FIGS. 21-22.
Figure 24:
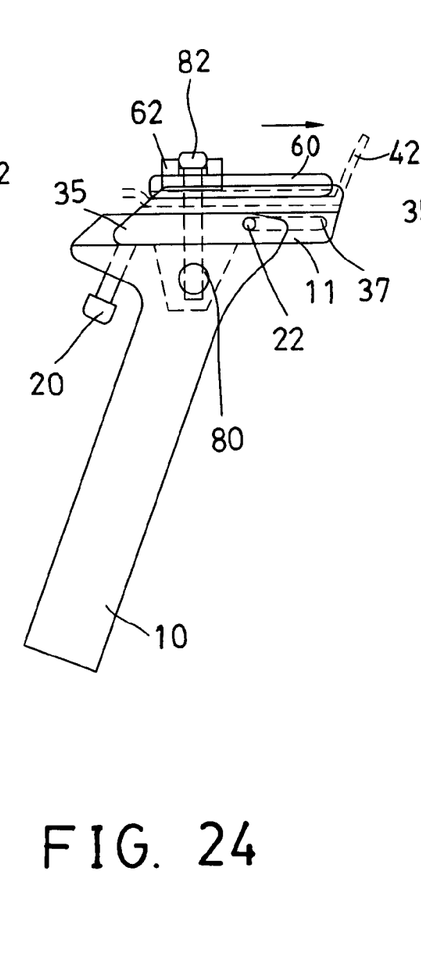
Figure 25:
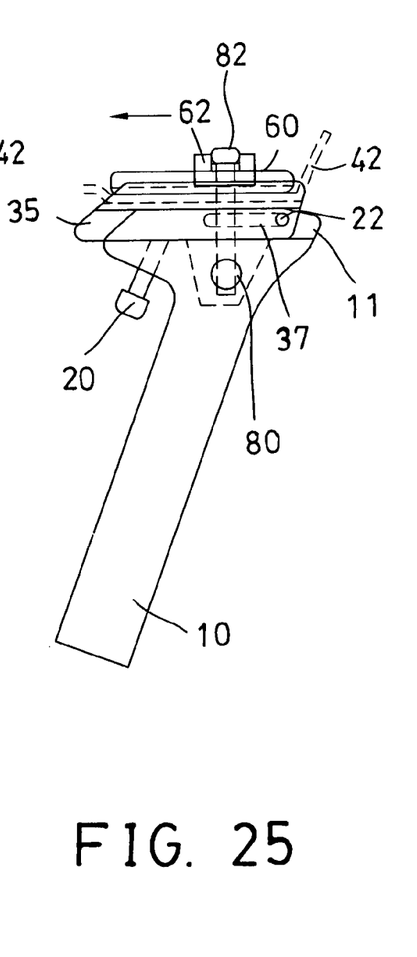

The upper clamp member 60 also includes a pathway 61 formed therein for slidably receiving an U-shaped bracket 62 which may be engaged with the fastener 82, and the fastener 82 may be engaged with the screw hole 81 of the rod 80 for solidly securing or clamping the casing 42 or the saddle 40 between the lower clamp member 35 and the upper clamp member 60 (FIG. 22). The fastener 82 may be engaged with the lower clamp member 35 for adjusting and maintaining the lower clamp member 35 and thus the upper clamp member 60 and the casing 42 or the saddle 40 at the suitable or selected angular position relative to the seat supporting base 11 (FIG. 23).

Figure 26:
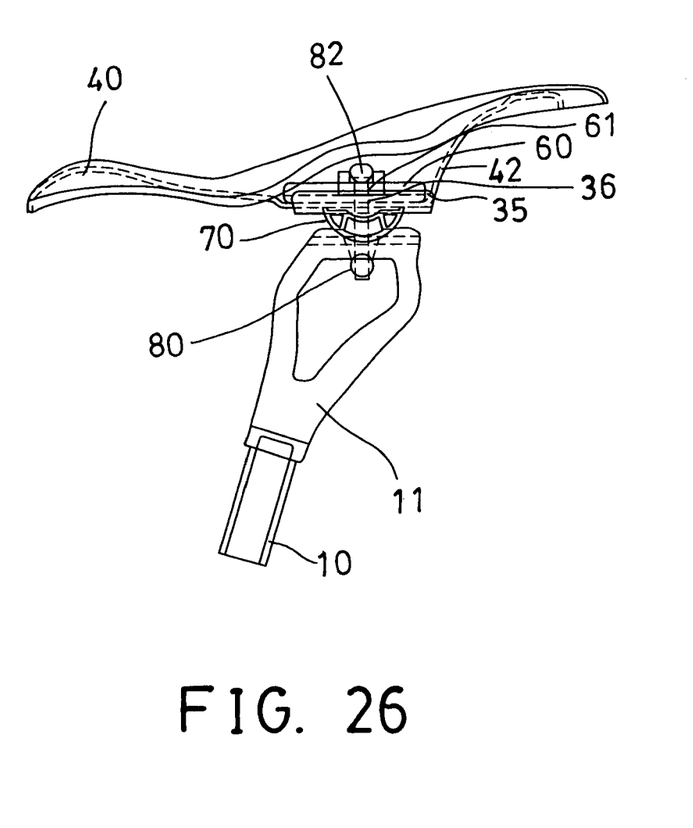
FIGS. 26, 27, 28 are partial rear plan schematic views similar to FIG. 22, illustrating the still further embodiment of the bicycle seat assembly.
Figure 27:
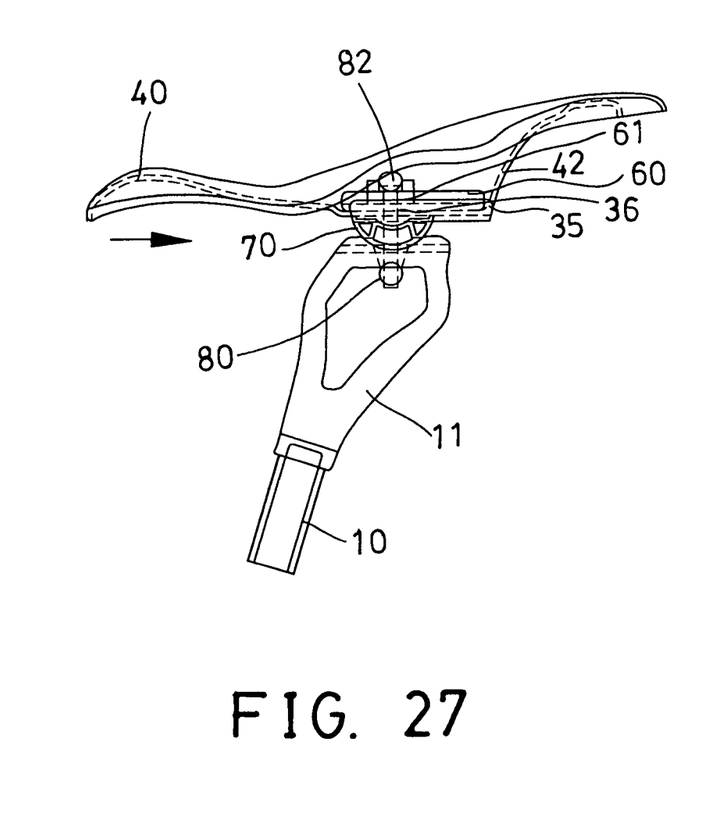
Figure 28:
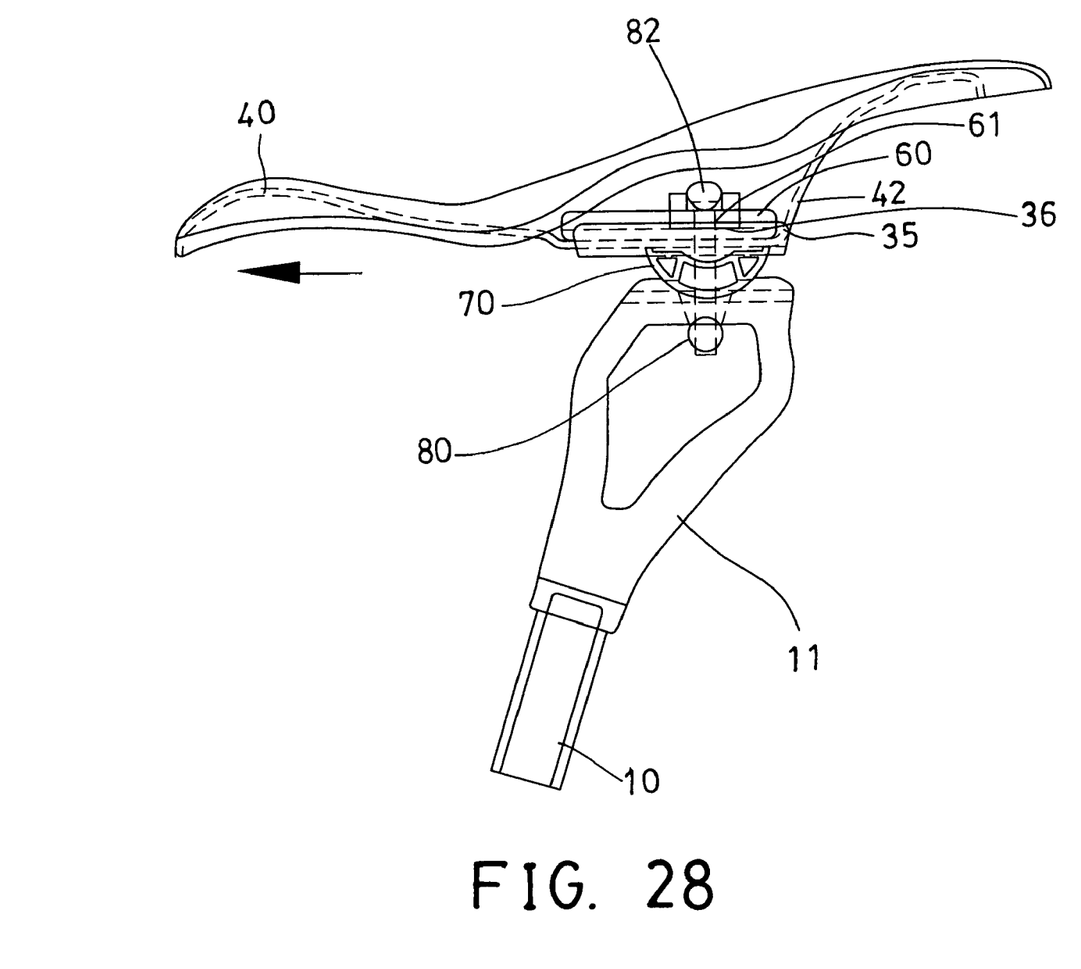

Referring next to FIGS. 26-28, another or a further lower clamp member 70 may further be provided and disposed or engaged or attached between the lower clamp member 35 and the seat supporting base 11, and the further lower clamp member 70 may include a concave or curved surface formed in the bottom or lower portion thereof for engaging with the corresponding concave or curved surface 12 of the seat supporting base 11 and for allowing the lower clamp members 35, 70 to be pivoted or rotated relative to the seat supporting base 11 to any suitable or selected angular position.

Accordingly, the bicycle seat assembly in accordance with the present invention includes a simplified clamp device for securing the bicycle seat assembly to the seat post.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A bicycle seat assembly comprising:
   a seat post including a seat supporting base provided on top, said seat supporting base including a passage formed therein and offset from said seat post,
   a lower clamp member disposed on said seat supporting base and including an oblong hole formed therein and aligned with said passage of said seat supporting base,
   a saddle including a space formed therein and defined by a casing which is extended downwardly from said saddle for engaging with said lower clamp member,
   an upper clamp member engaged into said space of said saddle for allowing said saddle to be clamped between said lower clamp member and said upper clamp member, said upper clamp member including a pathway formed therein, and including at least one recess formed therein,
   a pole seated and anchored in said at least one recess of said upper clamp member, and
   a fastener engaged through said passage of said seat supporting base and said oblong hole of said lower clamp member and said casing of said saddle and said pathway of said upper clamp member and engaged with said pole for securing and clamping said casing of said saddle between said lower clamp member and said upper clamp member.

2. The bicycle seat assembly as claimed in claim 1, wherein said seat supporting base includes a curved surface formed in an upper portion thereof, and said lower clamp member includes a curved surface formed in a lower portion thereof for engaging with said curved surface of said seat supporting base and for allowing said lower clamp member to be pivoted relative to said seat supporting base to selected angular positions.

3. The bicycle seat assembly as claimed in claim 1, wherein said lower clamp member includes a pair of side fences extended upwardly therefrom for engaging with said casing of said saddle and for anchoring said casing of said saddle between said side fences of said saddle.

4. The bicycle seat assembly as claimed in claim 1, wherein said saddle includes an open top for allowing said upper clamp member and said pole to be easily engaged into said space of said saddle and to be easily engaged with said fastener.

5. The bicycle seat assembly as claimed in claim 1, wherein said pole includes a screw hole formed therein for engaging with said fastener.

6. The bicycle seat assembly as claimed in claim 1, wherein said at least one recess of said upper clamp member is a lateral recess formed in an upper portion of said upper clamp member.

7. The bicycle seat assembly as claimed in claim 1, wherein said at least one recess of said upper clamp member is a longitudinal recess formed in an upper portion of said upper clamp member.

8. The bicycle seat assembly as claimed in claim 1, wherein said seat supporting base includes a pair of side fences extended upwardly therefrom for defining said curved surface between said side fences and for engaging with said lower clamp member.

* * * * *